Oct. 14, 1952        D. C. BAILEY        2,613,408
WEATHER STRIP
Filed Feb. 9, 1950
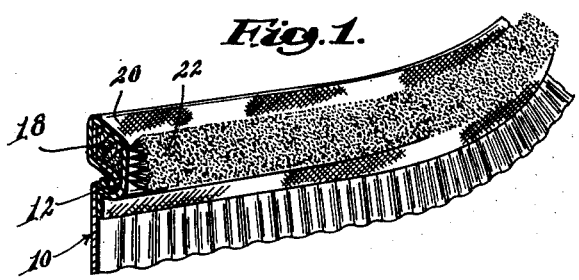
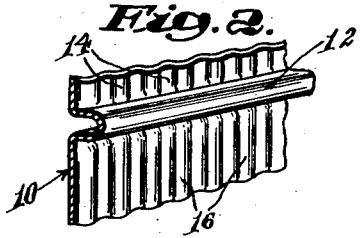
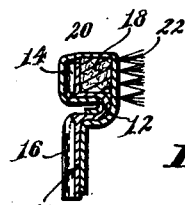
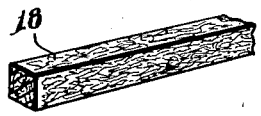
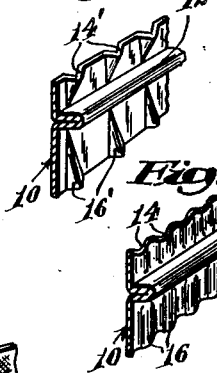
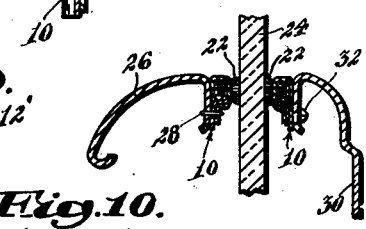
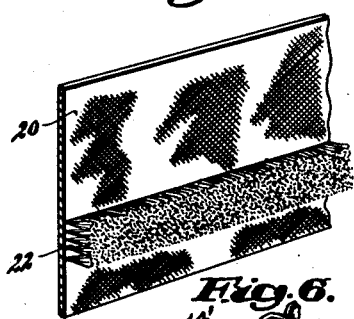
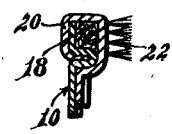
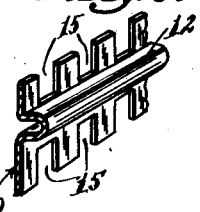
Inventor:
David C. Bailey
by John H. McKenna
Attorney Patented Oct. 14, 1952

2,613,408

UNITED STATES PATENT OFFICE 2,613,408

WEATHER STRIP

David C. Bailey, Amesbury, Mass., assignor to The Bailey Company, Incorporated, Amesbury, Mass., a corporation of Massachusetts Application February 9, 1950, Serial No. 143,295

7 Claims. (Cl. 20—69)

This invention relates to improvements in weatherstrips, and more particularly to weatherstrips which have a principal utility for closing spaces between the window glass and the frame elements around window openings in vehicles, and the like.

Heretofore, weatherstrips for vehicle windows have had a metal core strip which is slotted to facilitate bending of the weatherstrips in the plane of a strip. This core strip has been covered with fabric or has had extruded rubber formed thereon. However, both the fabric covered weatherstrips and the extruded rubber weatherstrips have had an objectionable tendency to become deformed away from the plane of the window glass. In other words, the flexible nature of both the slotted metal core strip and the covering material has resulted in a general lack of resistance to lateral bending and deformation of the weatherstrips away from the plane of the window glass. They have weakness in this respect because stiffness against lateral distortion has had to be sacrificed in order to provide needed flexibility in the plane of a weatherstrip.

It is among the objects of my present invention to provide a weatherstrip for vehicle windows, and the like, wherein a metal body-strip has opposite marginal portions which may be notched or corrugated to facilitate bending of the strip in the general plane of the strip, and has a portion between said marginal portions at which the strip is substantially stiffer and more rigid than at said marginal portions, whereby the said stiffer and more rigid portion stabilizes the strip in whatever shape it may acquire for following particular window frame curvatures.

Another object is to provide a weatherstrip for vehicle windows, and the like, wherein a metal body-strip has a stiffening rib extending longitudinally of the body-strip between two marginal portions of substantial width, and wherein a cushioning strip is mounted on one of said marginal portions of the body-strip at one side of the stiffening rib.

A further object is to provide a weatherstrip for vehicle windows, and the like, wherein a metal body-strip has a stiffening rib projecting a substantial distance laterally out of the general plane of the body-strip and extending longitudinally of the body-strip between two marginal portions of substantial width, said stiffening rib providing an abutment for engaging a cushioning strip mounted on one of said marginal portions of the body-strip.

Still another object of the invention is to provide a weatherstrip for vehicle windows, and the like, wherein an initially plane body-strip of sheet metal has a stiffening rib displaced laterally out of the plane of the body-strip at a location substantially inward from each side edge of the body-strip, the said rib extending from end to end of the body-strip, and constituting an abutment for engaging a cushioning strip mounted on one of said marginal portions of the body-strip.

Yet another object is to provide a weatherstrip for vehicle windows, and the like, wherein a sheet metal body-strip has a laterally projecting stiffening rib extending longitudinally of the body-strip between two corrugated marginal portions of the body-strip.

It is, moreover, my purpose and object generally to improve the structure and effectiveness of weatherstrips and especially weatherstrips of the general type suitable for vehicle windows, and the like.

In the accompanying drawings:

Fig. 1 is a perspective view of a short length of a weatherstrip embodying features of the invention;

Fig. 2 is a perspective view of a short length of the metal body-strip of the weatherstrip of Fig. 1;

Fig. 3 is a perspective view of a short length of the cushioning strip of the weatherstrip of Fig. 1;

Fig. 4 is a prespective view of a short length of the fabric covering sheet of the weatherstrip of Fig. 1;

Fig. 5 is a cross-sectional view of a weatherstrip similar to that of Fig. 1 but having its fabric covering sheet covering a larger area of the corrugated lower marginal portion of the body-strip than is covered in the weatherstrip of Fig. 1;

Fig. 6 is a perspective view of a short length of a metal body-strip similar to that of Fig. 2 but having tapering U-shaped corrugations spaced a substantial distance apart along the strip;

Fig. 7 is a similar view of a metal body-strip having its opposite marginal portions notched instead of being corrugated;

Fig. 8 is a perspective view of a short length of a modified form of metal body-strip, the walls of whose longitudinal ribs are closed together, and whose opposite marginal portions have corrugations similar to those of the strip of Fig. 6;

Fig. 9 is a view similar to Fig. 8 but showing corrugations as in the Fig. 2 strip;

Fig. 10 is a view of a strip similar to the Figs. 8 and 9 strips but showing notches along the opposite margins of the strip;

Fig. 11 is a cross-sectional view of a completed weatherstrip having a metal body-strip of the variety of any one of Figs. 8–10; and Fig. 12 is a cross-sectional view showing two of my improved weatherstrips mounted at opposite sides of a vehicle window glass, one weatherstrip being stapled to the interior garnish moulding and the other being clipped to an exterior portion of the vehicle body.

Referring to the drawings, the weatherstrip of Fig. 1 has a sheet metal body-strip 10 which, as best seen in Fig. 2, has a longitudinally extending rib 12 displaced laterally out of the general plane of the body-strip 10, the rib 12 preferably being U-shaped in cross-section and being located a substantial distance inward from the opposite side edges of the body-strip 10, whereby marginal portions of substantial width are left at opposite sides of the rib 12. The upper marginal portion, as seen in Fig. 2, has somewhat less width than the lower marginal portion and is provided with the corrugations 14. The lower marginal portion has similar corrugations 16.

A resilient cushioning or shim strip 18 is mounted on the upper marginal portion of the body-strip 10, with one side of the cushioning strip engaged against rib 12 which latter aids in properly positioning the cushioning strip 18 as well as aiding in maintaining its position under the stresses imposed upon it in service. The cushioning strip 18 may be cemented to the metal body-strip 10, if desired, or it may be held in place by the fabric covering strip 20 which is wrapped over the cushioning strip 18 and over the upper corrugated marginal portion of body-strip 10 and the rib 12. The covering strip 20 is cemented to the metal over which it is wrapped and, if desired, may be cemented to the cushioning strip 18. The fabric covering strip 20 ordinarily will be a mohair fabric, or a comparable pile fabric, from which the pile is omitted excepting at a relatively narrow region where the pile 22 is left for contacting a window glass 24, as shown in Fig. 12, wherein a conventional vehicle window garnish moulding is represented at 26, with a weatherstrip stapled thereto, as at 28, and an exterior portion of the vehicle body is represented at 30, with a weatherstrip secured thereto by conventional clips 32.

When weatherstrips of the general type to which the invention relates are being shaped to follow the curved contours of vehicle window openings, the bending of the strips into conformity with the said curved contours should be accomplished while all potrions of a strip continue in the general plane of the strip, so that the shaped strip will extend in a single plane, parallel to the window glass, when mounted, with no appreciable bulging of the strip out of that single plane, a condition which has been difficult to attain and maintain with the prior weatherstrip constructions. In the process of shaping the prior weatherstrips, there has been a strong tendency of the strips to become deformed laterally out of the general plane of the strips with the result that the shaped strips would not rest continuously and uniformly flat against a supporting surface. As a result, bulging parts sometimes are pounded into flatwise engagement with the support with a resulting distortion of the glass-engaging portions of the weatherstrip which deleteriously affects the function of the weatherstrip as well as detracting from the appearance of the vehicle window.

Weatherstrips embodying the features of my present invention have stiffness and rigidity which enable them to successfully resist lateral distortion during the process of shaping them to fit window contours, yet the increased stiffness and rigidity is primarily effective against undesirable lateral bending and distortion of the strips, without objectionably increasing the resistance of the strips to being bent in the general plane of a strip.

Fig. 6 shows a metal body strip similar to that of Fig. 2 but having a tapering U-shaped type of corrugations 14', 16' in the marginal portions of the strip. The corrugations 14', 16' are spaced along the strip to provide substantial plane portions of metal between adjacent corrugations.

While corrugations are preferable for facilitating bending of a metal body-strip in the plane of the strip, the margins may be notched, as at 15 in Fig. 7, for the same purpose, if desired.

It presently is considered preferable to form the stiffening longitudinal rib with an open generally U-shaped cross-section as illustrated at 12 in Figs. 1, 2, 5, 6 and 7. However, the U-walls of such a rib may be closed together as at 12' in Figs. 8–11, if desired. In Fig. 8 this closed form of rib 12' is shown on a metal body-strip having tapering corrugations 14', 16'; Fig. 9 shows it on a strip having conventional corrugations 14, 16; and Fig. 10 shows it on a strip whose margins have notches 15. Fig. 11 shows how one end of the covering fabric 20 may be clamped between the walls of a rib of the Figs. 8–11 form, thereby to effect a securement of this end portion of the covering fabric additional to its cement securement to the metal body-strip surfaces.

A feature of importance resides in the lower marginal portion of my improved weatherstrips which provides an effective region through which staples readily may be driven to secure the weatherstrips to a window garnish moulding, and to which conventional fastening clips may be secured for snap-on mounting of the weatherstrips on exterior portions of the vehicle body frame, as represented in Fig. 12. When any of the corrugated forms of metal body-strips are employed, a substantially smaller number of staples or clips ordinarily are required, as compared with prior weatherstrips, this being due to the greater stiffness against lateral distortion.

It is intended that the patent shall cover, by suitable expression in the appended claims, whatever features of patentable novelty exist in the invention disclosed.

I claim as my invention:

1. In a weatherstrip, a sheet metal body-strip having opposite marginal portions of substantial width disposed generally in a common plane, and having a longitudinal rib displaced laterally out of said common plane and extending along the body-strip between said opposite marginal portions thereof, a cushioning element extending along only one of said marginal portions of the body-strip and engaged against said longitudinal rib and against said one of the marginal portions of the body strip, and means securing the cushioning element in its said engaged position.

2. In a weatherstrip, a sheet metal body-strip having opposite marginal portions of substantial width disposed generally in a common plane and having corrugations therein extending transversely of the body-strip, and a rib displaced laterally out of said common plane and extending longitudinally of the body-strip between said corrugated marginal portions thereof, a cushioning element extending along only one of said marginal portions of the body-strip overlying the corrugations therein and resting against said rib, and a flexible sheet wrapped over said cushioning element and secured to adjacent surfaces of said one of the marginal portions of the body-strip and of said rib, said flexible sheet having a glass-engaging portion projecting laterally outward beyond said rib.

3. In a weatherstrip, a sheet metal body-strip having opposite marginal portions of substantial width disposed generally in a common plane, and a rib displaced a substantial distance laterally out of said common plane and extending longitudinally of the body-strip between said marginal portions thereof, said rib and one of said marginal portions of the body-strip providing angularly related walls, a cushioning element extending along only one of said marginal portions of the body-strip and engaged against said angularly related walls, and flexible sheet material wrapped over said cushioning element and adhered to adjacent surfaces of said one of the marginal portions of the body-strip and of said rib, said flexible sheet material having a glass-engaging portion projecting laterally outward beyond said rib.

4. In a weatherstrip, a sheet metal body-strip having opposite marginal portions of substantial width disposed generally in a common plane, and a rib of generally U-shaped cross-section displaced a substantial distance laterally out of said common plane and extending longitudinally of the body-strip between said opposite marginal portions thereof, a cushioning element confined to one side of said rib and seated between said rib and only one of said marginal portions of the body-strip, and a flexible sheet wrapped over said cushioning element and maintaining it seated, said flexible sheet having a glass-engaging portion projecting laterally outward beyond said rib.

5. A weatherstrip, comprising a sheet metal body-strip having opposite marginal portions of substantial width and having a laterally projecting rib extending longitudinally of the body-strip between said marginal portions thereof, a cushioning strip mounted on the body-strip in engagement with only one side of said rib and with only one of said marginal portions of the body-strip, and means engaging over said cushioning strip and securing it in its said engagement with said rib and said one marginal portion of the body-strip.

6. A weatherstrip, comprising a sheet metal body-strip having opposite marginal portions of substantial width corrugated transversely of the body-strip, a laterally projecting rib extending longitudinally of the body-strip between said corrugated marginal portions thereof, a cushioning strip seated against only one side of said rib and against only one of said corrugated marginal portions of the body-strip, and a flexible covering element wrapped around said seated cushioning strip and its supporting rib and marginal portion of the body-strip and cemented to surface portions of the body-strip.

7. A weatherstrip, comprising a sheet metal body-strip having a laterally projecting longitudinal rib disposed between two marginal portions which extend generally in a common plane at right angles to the plane of projection of said rib, said marginal portions of the body-strip being relatively easily bendable in the general plane of extent of the body strip and said rib constituting a stiffening element increasing the resistance of the body-strip to lateral bending thereof out of said general plane, a cushioning strip seated against only one side of said rib and against only one of said marginal portions of the body-strip, and a flexible sheet element binding the cushioning strip in its said seated position.

DAVID C. BAILEY.

REFERENCES CITED

The following references are of record in the file of this patent:

UNITED STATES PATENTS

| Number | Name | Date |
| --- | --- | --- |
| 1,862,705 | Reid | June 14, 1932 |
| 2,209,446 | Dennis | July 30, 1940 |
| 2,446,516 | Bailey | Aug. 10, 1948 |
| 2,457,312 | Kramer | Dec. 28, 1948 |
| 2,464,406 | Kramer | Mar. 15, 1949 |

FOREIGN PATENTS

| Number | Country | Date |
| --- | --- | --- |
| 379,844 | Great Britain | Sept. 8, 1932 |